US008532504B2

(12) United States Patent
Wagner et al.

(10) Patent No.: US 8,532,504 B2
(45) Date of Patent: Sep. 10, 2013

(54) COHERENT OPTICAL RECEIVER WITH ADAPTIVE EQUALIZER INITIALIZATION SYSTEM

(75) Inventors: Andrew Wagner, Los Altos, CA (US); Christian Malouin, San Jose, CA (US); Theodore J. Schmidt, Gilroy, CA (US)

(73) Assignee: Opnext Subsystems, Inc., Los Gatos, CA (US)

( * ) Notice: Subject to any disclaimer, the term of this patent is extended or adjusted under 35 U.S.C. 154(b) by 298 days.

(21) Appl. No.: 12/914,337

(22) Filed: Oct. 28, 2010

(65) Prior Publication Data

US 2012/0106982 A1 May 3, 2012

(51) Int. Cl.
*H04B 10/00* (2013.01)
(52) U.S. Cl.
USPC ............ 398/208; 398/205; 398/209; 398/211
(58) Field of Classification Search
USPC .................................................. 398/202–214
See application file for complete search history.

(56) References Cited

U.S. PATENT DOCUMENTS

| | | | | |
|---|---|---|---|---|
| 6,370,188 B1* | 4/2002 | Wu et al. | ......................... | 375/222 |
| 7,027,429 B2* | 4/2006 | Laroia et al. | ..................... | 370/350 |
| 7,227,835 B2* | 6/2007 | Belotserkovsky et al. | ... | 370/208 |
| 7,245,677 B1* | 7/2007 | Pare, Jr. | ........................... | 375/344 |
| 7,336,732 B1* | 2/2008 | Wiss | ............................... | 375/326 |
| 7,636,525 B1* | 12/2009 | Bontu et al. | .................... | 398/208 |
| 7,801,233 B1* | 9/2010 | Chow et al. | .................... | 375/260 |
| 7,924,910 B2* | 4/2011 | Bhoja et al. | .................... | 375/233 |
| 8,005,368 B2* | 8/2011 | Roberts et al. | ................ | 398/150 |
| 8,095,019 B2* | 1/2012 | Kaneda et al. | ................ | 398/208 |
| 8,233,809 B2* | 7/2012 | Qian et al. | ..................... | 398/208 |
| 8,260,156 B2* | 9/2012 | Qian et al. | ..................... | 398/209 |
| 8,295,714 B2* | 10/2012 | Winzer | ......................... | 398/209 |
| 2005/0058193 A1* | 3/2005 | Saed | .............................. | 375/232 |
| 2006/0104257 A1* | 5/2006 | Laroia et al. | ..................... | 370/350 |
| 2006/0146945 A1* | 7/2006 | Chow et al. | ..................... | 375/260 |
| 2007/0133697 A1* | 6/2007 | Spock et al. | .................... | 375/260 |
| 2007/0147850 A1* | 6/2007 | Savory et al. | ................. | 398/208 |
| 2008/0212717 A1* | 9/2008 | Wiss | .............................. | 375/326 |
| 2008/0219340 A1* | 9/2008 | Saed | .............................. | 375/231 |
| 2009/0161782 A1* | 6/2009 | Kolze et al. | .................... | 375/260 |
| 2010/0003028 A1* | 1/2010 | Zhang et al. | ..................... | 398/65 |
| 2010/0008678 A1* | 1/2010 | Caggioni et al. | .............. | 398/158 |
| 2010/0119241 A1* | 5/2010 | Yang et al. | ..................... | 398/208 |
| 2010/0316094 A1* | 12/2010 | Tung | .............................. | 375/150 |
| 2010/0329677 A1* | 12/2010 | Kaneda et al. | ................... | 398/65 |

(Continued)

FOREIGN PATENT DOCUMENTS

EP 2146448 A1 1/2010

OTHER PUBLICATIONS

Winzer et al., "Spectrally Efficient Long-Haul Optical Networking Using 112-Gb/s Polarization-Multiplexed 16-QAM", Journal of Lightwave Technology, vol. 28, No. 4, Feb. 15, 2010, pp. 547-556.

(Continued)

*Primary Examiner* — Agustin Bello
(74) *Attorney, Agent, or Firm* — Fenwick & West LLP (57) ABSTRACT

An adaptive-equalizer initialization system performs three functions: frequency offset estimation, taps estimation for chromatic dispersion filters, and taps initialization for an adaptive equalizer. The system contains hardware FFT and peak detector units that sense a pure tone that marks the beginning of a known, short data sequence.

18 Claims, 7 Drawing Sheets

(56) References Cited

U.S. PATENT DOCUMENTS

| | | | |
|---|---|---|---|
| 2011/0150477 A1* | 6/2011 | Winzer | 398/65 |
| 2011/0150503 A1* | 6/2011 | Winzer | 398/202 |
| 2011/0268459 A1* | 11/2011 | Rollins et al. | 398/208 |
| 2012/0106982 A1* | 5/2012 | Wagner et al. | 398/208 |

OTHER PUBLICATIONS

Authorized Officer Hannelore Filip, International Search Report/Written Opinion in PCT/US2011/058170 mailed Dec. 28, 2011, 12 pages.

* cited by examiner

COHERENT OPTICAL RECEIVER WITH ADAPTIVE EQUALIZER INITIALIZATION SYSTEM

TECHNICAL FIELD

The disclosure is generally related to optical communications systems and in particular to coherent optical receivers equipped with frequency-domain adaptive equalizers.

BACKGROUND

Next-generation long-haul, fiber-optic communications systems are being designed to operate at 100 gigabits per second over distances of 1,000 kilometers or more. Coherent optical receivers have been proposed as an alternative to conventional direct detection receivers for high-speed, fiber-optic systems because, among other reasons, they recover the phase of optical electric fields. When in-phase (I) and quadrature (Q) components of an optical signal are known, exact equalization of linear channel impairments is possible in principle and the effects of nonlinear impairments may be reduced.

Frequency-domain adaptive equalizers provide optimal linear channel compensation. The frequency taps of such an equalizer may be updated according to feedback from a slicer that makes symbol identification decisions. The difference between the slicer's output and input is used as an error signal to adjust equalizer taps. In quasi steady-state operation, an adaptive equalizer can run indefinitely with its taps being adjusted by small amounts to compensate for slowly changing channel conditions.

Starting an adaptive equalizer "blind" (i.e. with no channel knowledge), however, is problematic. The equalizer may be slow to converge to an optimal compensation estimate or it may not converge at all. It can get hung up on singularities. Therefore what is needed is a coherent optical receiver that has an adaptive equalizer initialization system. Such a system should allow a blind, adaptive equalizer to converge rapidly so that a high-speed fiber-optic link can be started or re-started in just a few milliseconds.

DETAILED DESCRIPTION

A coherent optical receiver with an adaptive equalizer initialization system is part of a fiber-optic communication link that is robust and quick to re-start. The equalizer compensates for channel impairments to maintain high symbol fidelity. Examples of channel impairments include optical fiber properties such as birefringence, chromatic dispersion, polarization mode dispersion and optical nonlinearities, as well as effects due to components such as reconfigurable optical add/drop multiplexers and optical amplifiers.

Figure 1:
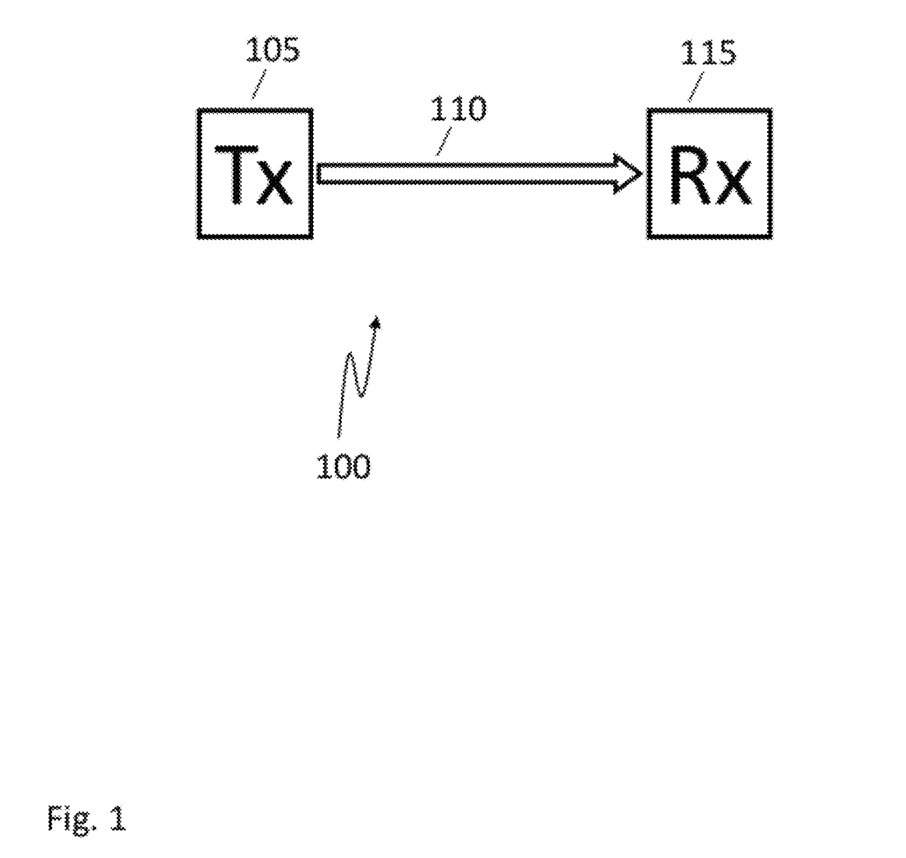
FIG. 1 is a block diagram of an optical communications system.

FIG. 1 is a block diagram of an optical communications system 100. In FIG. 1, a coherent optical transmitter 105 sends signals over an optical channel 110 to a coherent optical receiver 115. This system may be described by:

$$\vec{E}_{out} = H\vec{E}_{in}$$

where $\vec{E}_{in}$ and $\vec{E}_{out}$ are the transmitted and received electric fields respectively and $$H = \begin{bmatrix} H_{xx} & H_{xy} \\ H_{yx} & H_{yy} \end{bmatrix}$$

represents the channel for orthogonal polarizations, x and y. $\vec{E}_{in}$ may be estimated at the receiver through the use of an equalizer represented by W:

$$\vec{E}_{in} \approx W\vec{E}_{out}$$

W is not (merely) $H^{-1}$; rather W is an optimal compensation estimate that minimizes received symbol errors. W may be updated according to an equalizer update equation:

$$W_{k+1}^T = W_k^T 2\mu\epsilon_k r_k^H$$

where $\mu$ is equalizer gain, $\epsilon$ is a symbol error term, and r is a received symbol. ($^T$ indicates transpose, $^H$ indicates hermitian conjugate, and k is an index.) An adaptive equalizer running in a coherent optical receiver is stable in the presence of perturbations. However, if the equalizer is started blind with no channel information, it may converge slowly or not at all.

The coherent optical receiver described below includes an initialization system for a frequency-domain adaptive equalizer. The initialization system is configured to cause the equalizer to converge rapidly. The system uses a short, repetitive sequence of known data (sent by the transmitter and compared to the same known data at the receiver) to generate initial equalizer frequency-domain taps.

Figure 2A:
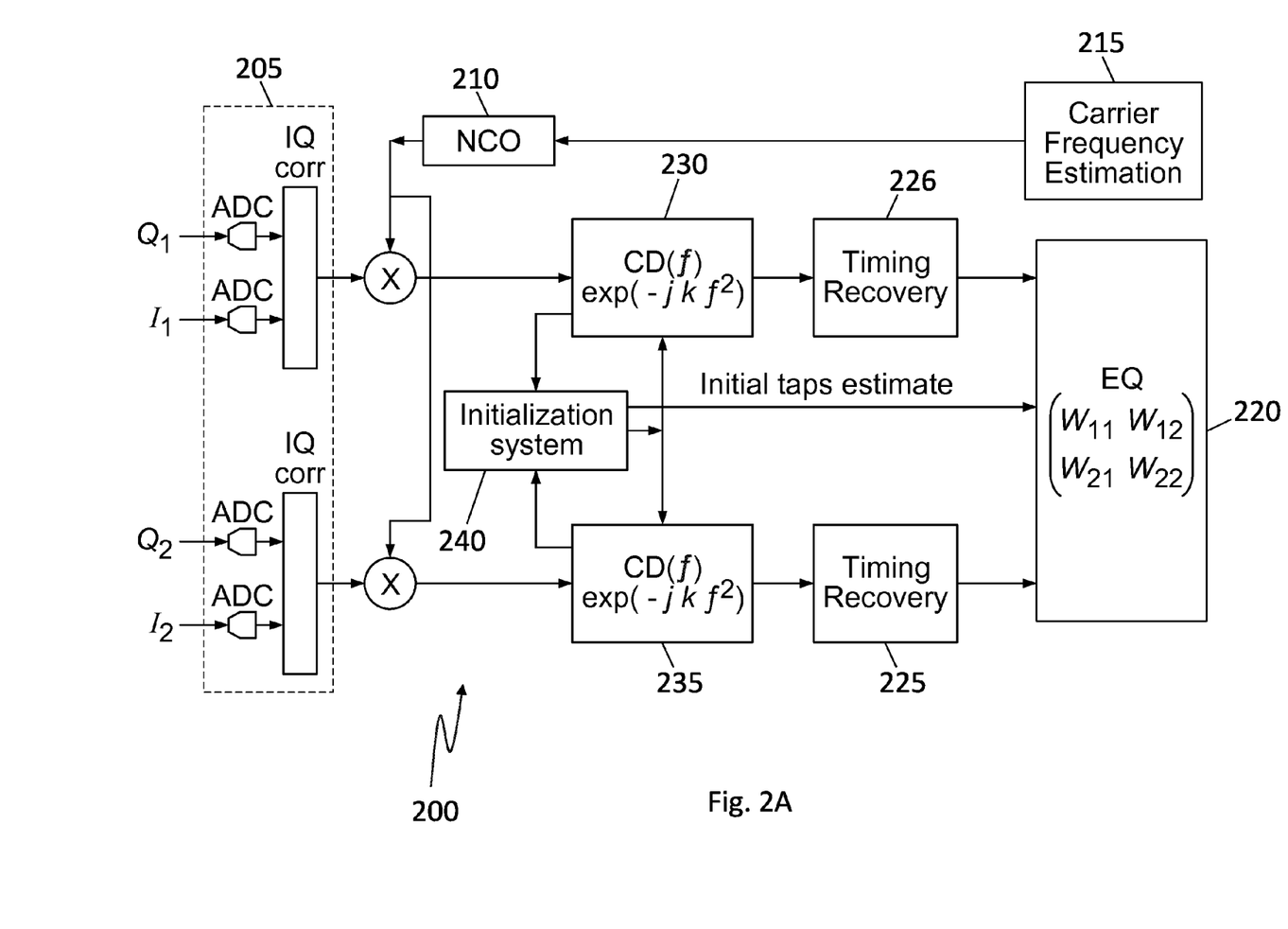
FIG. 2A is a functional block diagram of part of a coherent optical receiver equipped with an adaptive equalizer.
Figure 2B:
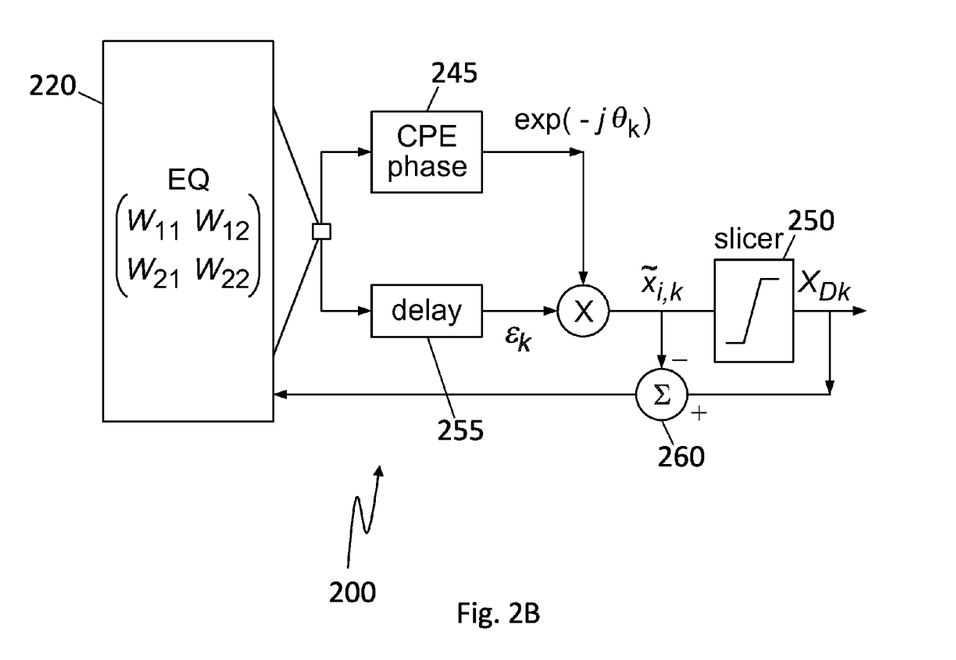
FIG. 2B is a functional block diagram of part of a coherent optical receiver equipped with an adaptive equalizer.

FIGS. 2A and 2B are a functional block diagram of a coherent optical receiver 200 equipped with an adaptive equalizer. (The figures are split into parts A and B for convenience of illustration only.) In FIGS. 2A and 2B, in-phase ($I_1$, $I_2$) and quadrature ($Q_1$, $Q_2$) signals for two polarizations (x and y) obtained from a coherent optical detector (not shown) are inputs to block 205. Block 205 includes high-speed analog to digital converters (ADC) and IQ correction sections that perform initial signal conditioning tasks such as I and Q level balancing, skew, phase and coarse frequency adjustments, and local oscillator calibration. The outputs (one each for x and y polarizations) of block 205 are mixed with the output of a numerically controlled oscillator (NCO) 210 which is driven by carrier frequency estimate (CFE) block 215. Signals from block 205, after mixing with the output of NCO 210, are input to chromatic dispersion (CD) filters 230 (for x polarization) and 235 (for y polarization). The outputs of the chromatic dispersion filters are sent to timing recovery blocks 225, 226. Outputs from the timing recovery blocks form inputs to adaptive equalizer 220.

Adaptive equalizer 220 is a frequency-domain, 2×2 equalizer. Its output is sent to carrier phase estimation (CPE) filter 245 and delay block 255. The outputs of CPE filter 245 and delay 255 are mixed and sent to slicer 250 which makes symbol decisions. Estimated symbols $\tilde{x}_{i,k}$ are input to the slicer; exact, "decided" symbols $x_{D,k}$ are its output, where subscript k is a time step index. The difference between the decided and estimated value for each symbol is fed back to equalizer 220 which uses that information according to an equalizer update equation such as the one discussed above.

In one embodiment, equalizer initialization system 240 contains a continuously running, fast Fourier transform (FFT) unit and a peak detector unit that act as a sequence start detector. The FFT and peak detector are both implemented in hardware as part of an application specific integrated circuit (ASIC). Receiver 200, as a whole, is implemented in a combination of hardware ASIC and software. For example, ADCs within block 205, initialization system 240, CD filters 230 and 235, equalizer 220, carrier phase estimation filter 245, and slicer 250 are parts of an ASIC, while other functions may be performed in hardware or software. In other embodiments, a sequence start detector in equalizer initialization system 240 may detect the arrival of an initialization sequence with a narrow bandwidth filter, a cross-correlator, a power threshold detector, a combination of any of these devices, or one or more of these devices in combination with a hardware FFT and peak detector unit.

Figure 3:
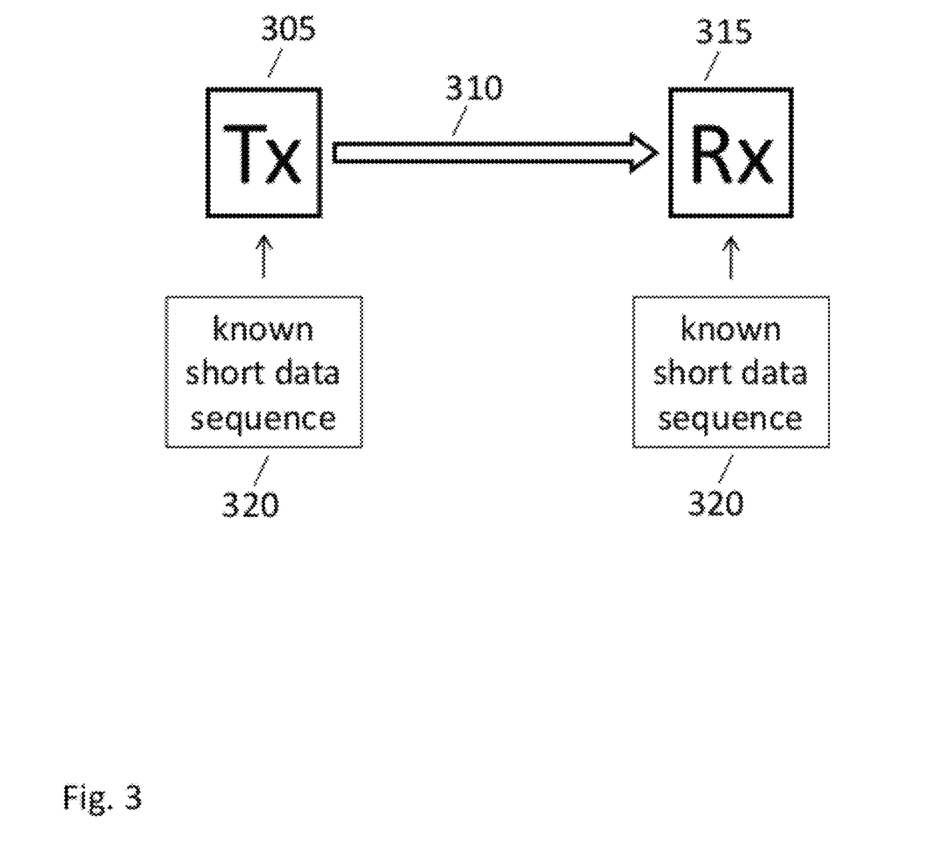
FIG. 3 is a block diagram of an optical communications system showing a known, short data sequence introduced at both the transmitter and receiver.

Equalizer initialization system 240 is configured to cause a blind equalizer (e.g. 220) to converge to an optimal compensation estimate. The initialization system detects a known, short data sequence that is sent from time to time by a transmitter in an optical communications link. For example, FIG. 3 is a block diagram of an optical communications system showing a known, short data sequence 320 introduced at both the transmitter and receiver. (In FIG. 3, a coherent optical transmitter 305 sends signals over an optical channel 310 to a coherent optical receiver 315, in analogy to the system shown in FIG. 1.) The length of a known, short data sequence (e.g. 320) may be as short as about twice as long as the length of chromatic dispersion filters 230, 235, but it is less than one hundred times the length of the filters. Preferably the known, short data sequence is between about four times and eight times the length of the CD filter. The short sequence 320 and the initialization system 240 allow a frequency domain equalizer 220 to operate in blind mode to avoid cycle slips, yet converge quickly and avoid singularities.

Details concerning how initialization system 240 uses a known, short data sequence (e.g. 320), and how such a data sequence may be constructed, are now discussed.

Figure 4:
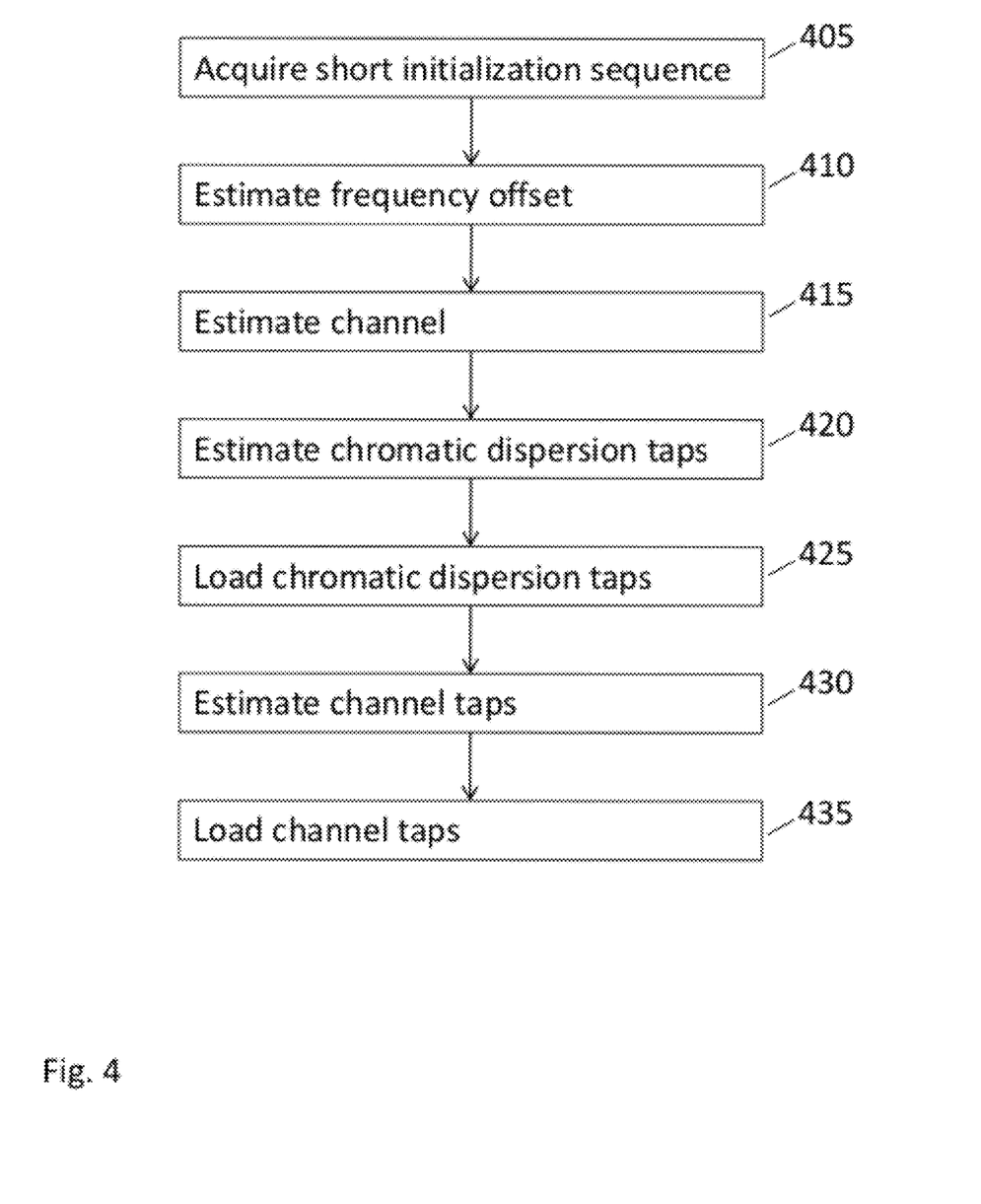
FIG. 4 shows steps in an operating procedure for an initialization system for a coherent optical receiver equipped with an adaptive equalizer.

FIG. 4 shows steps in an operating procedure for an initialization system for a coherent optical receiver equipped with an adaptive equalizer. Not all of the steps in FIG. 4 need be performed every time they are executed by an equalizer initialization system, nor do they necessarily need to be performed in the order shown. In FIG. 4, step 405 is detect and acquire short initialization sequence; step 410 is estimate frequency offset; step 415 is estimate channel; step 420 is estimate chromatic dispersion taps; step 425 is load chromatic dispersion taps into a chromatic dispersion filter; step 430 is estimate channel taps; and, step 435 is load channel taps in to an equalizer.

Equalizer initialization system 240 contains a continuously running, fast Fourier transform (FFT) unit and a peak detector unit. As described below, part of an initialization sequence (e.g. short data sequence 320) is a pure tone. The FFT and peak detector detect this pure tone and measure its frequency. (The Fourier transform of a pure tone is sharply peaked.) The difference between the measured tone frequency and its known value gives a frequency offset estimate that is sent to chromatic dispersion filters 230 and 235.

As described below, another part of an initialization sequence (e.g. short data sequence 320) is short, repetitive data with concentrated spectral components. This part of the sequence is used for estimating chromatic dispersion filter taps and providing an initial estimate for adaptive equalizer taps.

Chromatic dispersion (CD) filters 230 and 235 compensate chromatic dispersion introduced by physical properties of an optical fiber link. The frequency domain transfer function for an optical fiber has the form:

$$H(f) \propto \exp\left[-j\frac{CD\lambda^2}{4\pi c}(2\pi f)^2\right]$$

$$\propto \exp[-jkf^2]$$

where CD is the cumulative chromatic dispersion of the fiber (e.g. in ps/nm), $\lambda$ is the wavelength of the optical carrier (e.g. in nm), f is the frequency (e.g. in GHz) of the signal that represents transmitted data and c is the speed of light (e.g. in m/s). k is an adjustable chromatic dispersion parameter. CD filters 230 and 235 find and use optimum values of k to compensate for chromatic dispersion in an optical fiber transmission system.

Figure 5:
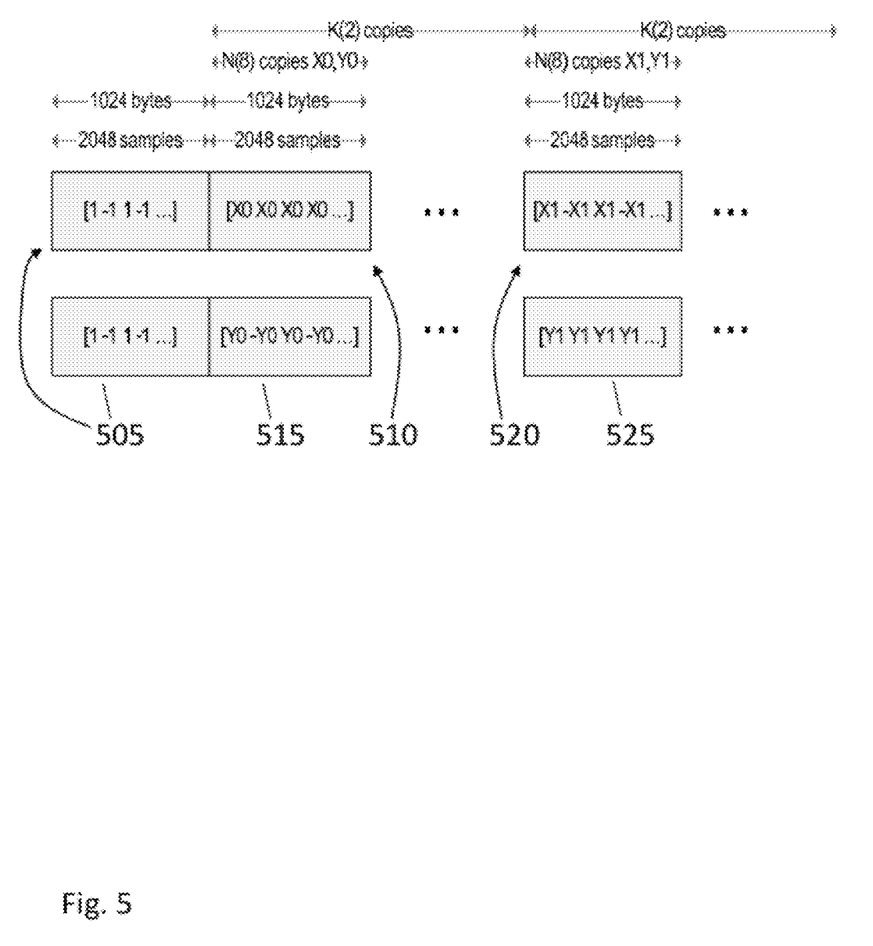
FIG. 5 shows an example of a known, short data sequence designed for use with an initialization system for a coherent optical receiver equipped with an adaptive equalizer.

Estimating chromatic dispersion filter taps is done by varying k to find the sharpest possible cross correlation between the CD filter input and output when the input is known. CD filters for each polarization may be adjusted separately since CD is polarization insensitive. As an example, the width of cross correlation function $$r_x e^{-jkf^2} * t_x$$

varies depending on k. The optimum value of k for the CD filter is the one that yields the narrowest cross correlation peak. (The star symbol (*) represents cross correlation.) Here $r_x$ is the x-polarized received signal corresponding to known, x-polarized sequence $t_x$. Examples of short sequences, $t_x$ and $t_y$ (where subscripts indicate polarization) include sequences 510, 515, 520 and 525 described below. Once an optimum value for k is found, taps for the CD filter provide a digital representation of the transfer function $H(f) \propto \exp[-jkf^2]$.

Transmitted signal $t_x$ usually does not remain in its original polarization because birefringence and polarization mode dispersion in a fiber alter the polarization of optical signals. Thus, the cross correlation $r_x e^{-jkf^2} * t_x$ may not provide optimum results. A more robust calculation is $(r_x + r_y) e^{-jkf^2} * t_x$ so that both received polarizations are considered. Alternatively, one may calculate $r_x e^{-jkf^2} * t_x$, $r_x e^{-jkf^2} * t_y$, $r_y e^{-jkf^2} * t_y$ and $r_y e^{-jkf^2} * t_x$, and take the sharpest peak. Or, rotations may be applied to the vector $(r_x, r_y)$ before cross correlation.

Other methods for optimizing k are possible. For example, starting from the channel, G, as determined from a short initialization data sequence, $$G = \begin{bmatrix} \frac{r_x}{t_x} & \frac{r_x}{t_y} \\ \frac{r_y}{t_x} & \frac{r_y}{t_y} \end{bmatrix}$$

one may calculate $G^{-1}$, $$G^{-1} = \begin{bmatrix} u_{xx} & u_{xy} \\ u_{yx} & u_{yy} \end{bmatrix}$$

the matrix inverse of G. Next, one may determine which vector in $G^{-1}$ (i.e. $u_{xx}$, $u_{xy}$, etc.) is most useful in further calculations by calculating energy content by summing squared magnitude over frequency taps, e.g., $$\sum_{\substack{freq \\ taps}} |u_{ij}|^2$$

Denote the vector having the greatest energy, $u_0$.

Now, to optimize k, form the expression, $$A = |\text{IFFT}\{u_0 e^{-jkf^2}\}|^2$$

and record the value of the maximum tap in A. Finally, sweep k until the value of the maximum tap in A is greatest.

A second use of the short, repetitive data sequences by the equalizer initialization system is to provide an initial estimate for adaptive equalizer taps after chromatic dispersion has been compensated. Equalizer 220, among other things, compensates for effects that mix x and y polarization frequency responses. Thus the channel as determined from a short initialization data sequence, and compensated for chromatic dispersion, may be written:

$$G = \begin{bmatrix} \frac{r_x}{t_x} e^{jkf^2} & \frac{r_x}{t_y} e^{jkf^2} \\ \frac{r_y}{t_x} e^{jkf^2} & \frac{r_y}{t_y} e^{jkf^2} \end{bmatrix}$$

where k has been determined by one or more of the methods described above.

$G^{-1}$, the matrix inverse of G, is now a "zero forcing" solution to compensate the channel. $G^{-1}$ is not a very good estimate for W, but it is easy to calculate and provides a robust input to an adaptive equalizer. Thus, $G^{-1}$, expressed in terms of frequency domain taps is loaded into the equalizer as an initial condition from which the equalizer quickly and reliably converges to an optimal channel compensation estimate. Robust initial conditions for the equalizer may also be determined by other methods including, for example, minimum mean squared error (MMSE) techniques.

We have seen that the initialization system performs three functions: frequency offset estimation, taps estimation for chromatic dispersion filters, and taps initialization for an adaptive equalizer. The system contains hardware FFT and peak detector units that sense a pure tone that marks the beginning of a known, short data sequence. The known data sequence is now described in more detail.

FIG. 5 shows an example of a known, short data sequence designed for use with an initialization system for a coherent optical receiver equipped with an adaptive equalizer. FIG. 5 shows sequence information subdivided into blocks that are transmitted in x (e.g. blocks 505, 510, 520) and y (e.g. blocks 505, 515, 525) polarizations. The exact number of bytes, samples, and copies of data in the known sequence are described as examples. Similarly designed sequences can perform a similar function.

In the example of FIG. 5, both x and y polarization sequences begin with a pure tone represented in time as [1, −1, 1, −1, ...]. This tone is sampled 2048 times to form 1024 bytes. The x polarization sequence contains two copies of one sequence 510 followed by two copies of another sequence 520. Sequence 510 is itself [X0, X0, X0, X0, X0, X0, X0, X0], while sequence 520 is [X1, −X1, X1, −X1, X1, −X1, X1, −X1]. Here X0 and X1 are 256-sample sequences represented by 128 bytes each. The y polarization sequence contains two copies of one sequence 515 followed by two copies of another sequence 525. Sequence 515 is itself [Y0, −Y0, Y0, −Y0, Y0, −Y0, Y0, −Y0], while sequence 525 is [Y1, Y1, 1/1, Y1, Y1, Y1, Y1, Y1]. Here Y0 and Y1 are 256-sample sequences represented by 128 bytes each. These sequences, and others that may be similarly designed, have carefully chosen spectral characteristics.

Figure 6:
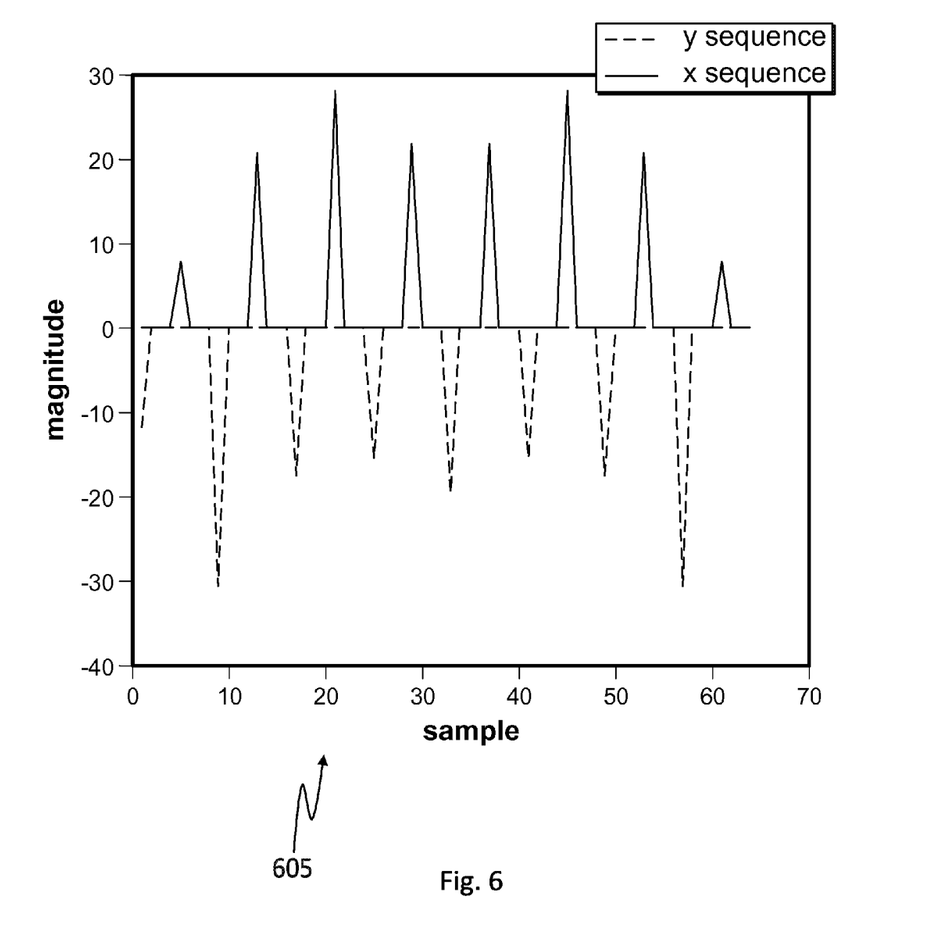
FIG. 6 shows an example of spectral characteristics of a known, short data sequence designed for use with an initialization system for a coherent optical receiver equipped with an adaptive equalizer.

FIG. 6 shows an example 605 of spectral characteristics of a known, short data sequence designed for use with an initialization system for a coherent optical receiver equipped with an adaptive equalizer. Graph 605 shows the magnitude of the FFT of sequences 510, 515, 520, 525 of FIG. 5 plotted versus FFT sample number. Because of the way the sequences are constructed, positive magnitude spikes in graph 650 correspond to the x polarization sequence while negative magnitude spikes correspond to the y polarization sequence. The repeated data in the sequences of FIG. 5 leads to the sharp spectral peaks shown in FIG. 6. These sharp peaks provide better signal to noise characteristics for the zero-forcing channel estimate discussed above than would a smoother spectrum.

The equalizer initialization system may use many different types of initialization data; however, the sequences described above have several distinct properties: they start with a pure tone; they are short; and, they concentrate energy in a few sharp spectral peaks. The pure tone is used for initialization data detection and frequency offset estimation. The short sequence length ensures that the initialization system does not add excessive overhead to the channel and therefore allows a short, known data sequence to be repeated often enough that an equalizer can be restarted quickly after a system interruption. The known data is designed so that its energy is concentrated in a few, sharp spectral peaks leading to better channel estimation for equalizer initialization.

The description of the disclosed embodiments is provided to enable any person skilled in the art to make or use them. Various modifications to these embodiments will be readily apparent to those skilled in the art and the principles explained herein may be applied to other embodiments without departing from the scope of the disclosure. Thus, the disclosure is not intended to be limited to the embodiments shown, but is to be accorded the widest scope consistent with the principles and novel features disclosed.

What is claimed is:

1. An optical coherent receiver comprising:
a chromatic dispersion filter that compensates for chromatic dispersion in two polarizations of a received optical signal, the received optical signal comprising a sequence of known data, the sequence of known data beginning, when transmitted, with a pure tone segment comprising substantially a single first frequency;
a frequency domain adaptive equalizer that receives output from the chromatic dispersion filter and configured to compensate for impairments in a channel carrying the received optical signal; and,
an adaptive equalizer initialization system, coupled to the chromatic dispersion filter and the adaptive equalizer, the initialization system comprising a sequence start detector configured to receive the received optical signal and perform a frequency domain analysis to determine spectral characteristics of the sequence of known data, the spectral characteristics comprising a peak at a second frequency, the peak corresponding to the pure tone segment of the sequence of known data;

wherein the initialization system:
estimates frequency offset from a difference between the first frequency and the second frequency;
estimates chromatic dispersion from the spectral characteristics of the sequence of known data; and
loads chromatic dispersion taps into the chromatic dispersion filter based on the estimated frequency offset and estimated chromatic dispersion.

2. The optical coherent receiver of claim 1 wherein the sequence start detector comprises a hardware fast Fourier transform (FFT) unit configured to perform, at least in part, the frequency domain analysis.

3. The optical coherent receiver of claim 1 wherein the sequence start detector comprises a narrow bandwidth filter configured to perform, at least in part, the frequency domain analysis.

4. The optical coherent receiver of claim 1 wherein the sequence start detector comprises a cross-correlator configured to perform, at least in part, the frequency domain analysis.

5. The optical coherent receiver of claim 1 wherein the initialization system optimizes the estimate of chromatic dispersion by finding a minimum-width cross-correlation between the sequence of known data as transmitted and a corresponding portion of the received data signal.

6. The optical coherent receiver of claim 1 wherein:
the spectral characteristics further comprise one or more additional peaks at corresponding additional frequencies; and
the initialization system is further configured to estimate channel impairment based on the additional peaks and load initial equalizer taps into the adaptive equalizer based on the estimated channel impairment.

7. The optical coherent receiver of claim 1 further comprising a slicer that provides discrete symbol output based on estimated symbol input from the adaptive equalizer and provides a feedback error signal to the adaptive equalizer.

8. The optical coherent receiver of claim 1 wherein the sequence of known data is longer than two times a length of the chromatic dispersion filter and shorter than 100 times the length of the chromatic dispersion filter.

9. The optical coherent receiver of claim 1 wherein the sequence of known data is between about four times a length of the chromatic dispersion filter and about eight times the length of the chromatic dispersion filter.

10. The optical coherent receiver of claim 1 wherein energy in the sequence of known data as transmitted is concentrated in sharply-peaked spectral features and the estimate of chromatic dispersion is based on a comparison of the spectral characteristics and the sharply-peaked spectral features.

11. The optical coherent receiver of claim 1 wherein the sequence of known data comprises repeated copies of initialization data.

12. The optical coherent receiver of claim 1 wherein spectral features corresponding to parts of the sequence of known data transmitted in one polarization of the optical signal have positive magnitudes, and spectral features corresponding to parts of the sequence of known data transmitted in another polarization of the optical signal have negative magnitudes.

13. A method for initializing an optical coherent receiver, comprising:
receiving an optical signal comprising a sequence of known data, the sequence of known data beginning, when transmitted, with a pure tone segment comprising substantially a single first frequency;
performing, by a chromatic dispersion filter, an initial chromatic dispersion compensation on the received optical signal;
analyzing the received optical signal to determine spectral characteristics of the sequence of known data, the spectral characteristics comprising a peak at a second frequency, the peak corresponding to the pure tone segment of the sequence of known data;
estimating frequency offset from a difference between the first frequency and the second frequency;
estimating chromatic dispersion from the spectral characteristics; and
loading chromatic dispersion taps into the chromatic dispersion filter based on the estimated frequency offset and estimated chromatic dispersion.

14. The method of claim 13, wherein the estimate of chromatic dispersion is optimized by finding a minimum-width cross-correlation between the sequence of known data as transmitted and a corresponding portion of the received signal.

15. The method of claim 13, wherein the spectral characteristics further comprise one or more additional peaks at corresponding additional frequencies, the method further comprising:
estimating channel impairment based on the additional peaks; and
loading initial equalizer taps into the adaptive equalizer based on the estimated channel impairment.

16. The method of claim 13, wherein energy in the sequence of known data as transmitted is concentrated in sharply-peaked spectral features and the estimate of chromatic dispersion is based on a comparison of the spectral characteristics and the sharply-peaked spectral features.

17. The method of claim 13, wherein the sequence of known data comprises repeated copies of initialization data.

18. The method of claim 13, wherein spectral features corresponding to parts of the sequence of known data transmitted in one polarization of the optical signal have positive magnitudes, and spectral features corresponding to parts of the sequence of known data transmitted in another polarization of the optical signal have negative magnitudes.

* * * * *

UNITED STATES PATENT AND TRADEMARK OFFICE
CERTIFICATE OF CORRECTION

| | | |
|---|---|---|
| PATENT NO. | : 8,532,504 B2 | Page 1 of 1 |
| APPLICATION NO. | : 12/914337 | |
| DATED | : September 10, 2013 | |
| INVENTOR(S) | : Andrew Wagner et al. | |

It is certified that error appears in the above-identified patent and that said Letters Patent is hereby corrected as shown below:

In the Claims

Claim 5, Column 7, line 32, after "received" delete "data"

Signed and Sealed this
First Day of July, 2014

Michelle K. Lee
*Deputy Director of the United States Patent and Trademark Office*